United States Patent [19]

Cha

[11] Patent Number: 4,877,566
[45] Date of Patent: Oct. 31, 1989

[54] NON-TOXIC RUBBER-BASED COMPOSITION AND METHOD FOR MAKING THE RUBBER BASED COMPOSITION

[75] Inventor: Tongil Cha, Seoul, Rep. of Korea

[73] Assignee: Pop-Limited, Georgetown, Caymen Islands

[21] Appl. No.: 719,701

[22] Filed: Apr. 4, 1985

[51] Int. Cl.$^4$ .............................................. B29C 59/00
[52] U.S. Cl. ................................. 264/118; 264/328.18; 264/331.13; 264/328.14; 524/274; 524/426; 524/427; 524/575
[58] Field of Search ............... 524/426, 427, 575, 274; 264/118, 328.18, 331.13, 328.14

[56] References Cited

U.S. PATENT DOCUMENTS

| | | | |
|---|---|---|---|
| 3,259,602 | 7/1966 | Hoel | 524/575 |
| 3,265,765 | 8/1966 | Holden et al. | 524/534 |
| 4,116,909 | 9/1978 | Muller | 524/426 |
| 4,153,589 | 5/1979 | Triolo | 524/426 |
| 4,216,131 | 8/1980 | Himes et al. | 524/426 |
| 4,236,715 | 12/1980 | Middlebrook | 524/575 |
| 4,277,232 | 7/1981 | Taluba et al. | 425/DIG. 57 |
| 4,407,890 | 10/1983 | Buzzi | 524/575 |
| 4,409,359 | 10/1983 | Tanimura et al. | 524/274 |
| 4,476,273 | 10/1984 | Senatore | 524/426 |
| 4,481,355 | 11/1984 | Stark, Jr. | 264/331.13 |
| 4,491,655 | 1/1985 | Sandstrom | 524/274 |
| 4,493,925 | 1/1985 | Trivette, Jr. | 524/426 |
| 4,495,323 | 1/1985 | Collins | 524/426 |

FOREIGN PATENT DOCUMENTS

| | | | |
|---|---|---|---|
| 0602830 | 8/1960 | Canada | 524/274 |
| 0025805 | 11/1964 | Japan | 524/274 |
| 0012358 | 7/1967 | Japan | 524/274 |
| 0018772 | 5/1974 | Japan | 524/274 |
| 0018744 | 2/1976 | Japan | 524/575 |
| 0063344 | 4/1982 | Japan | 524/426 |
| 0196239 | 11/1983 | Japan | 524/426 |
| 2057458 | 4/1981 | United Kingdom | 524/274 |

Primary Examiner—Joseph L. Schofer
Assistant Examiner—J. M. Reddick
Attorney, Agent, or Firm—Ladas & Parry

[57] ABSTRACT

A non-toxic rubber-based composition for use in manufacturing toys which contains styrene butadiene rubber, naphthene oil, ester gum, calcium carbonate and a coloring agent, and a method for making same.

1 Claim, 2 Drawing Sheets

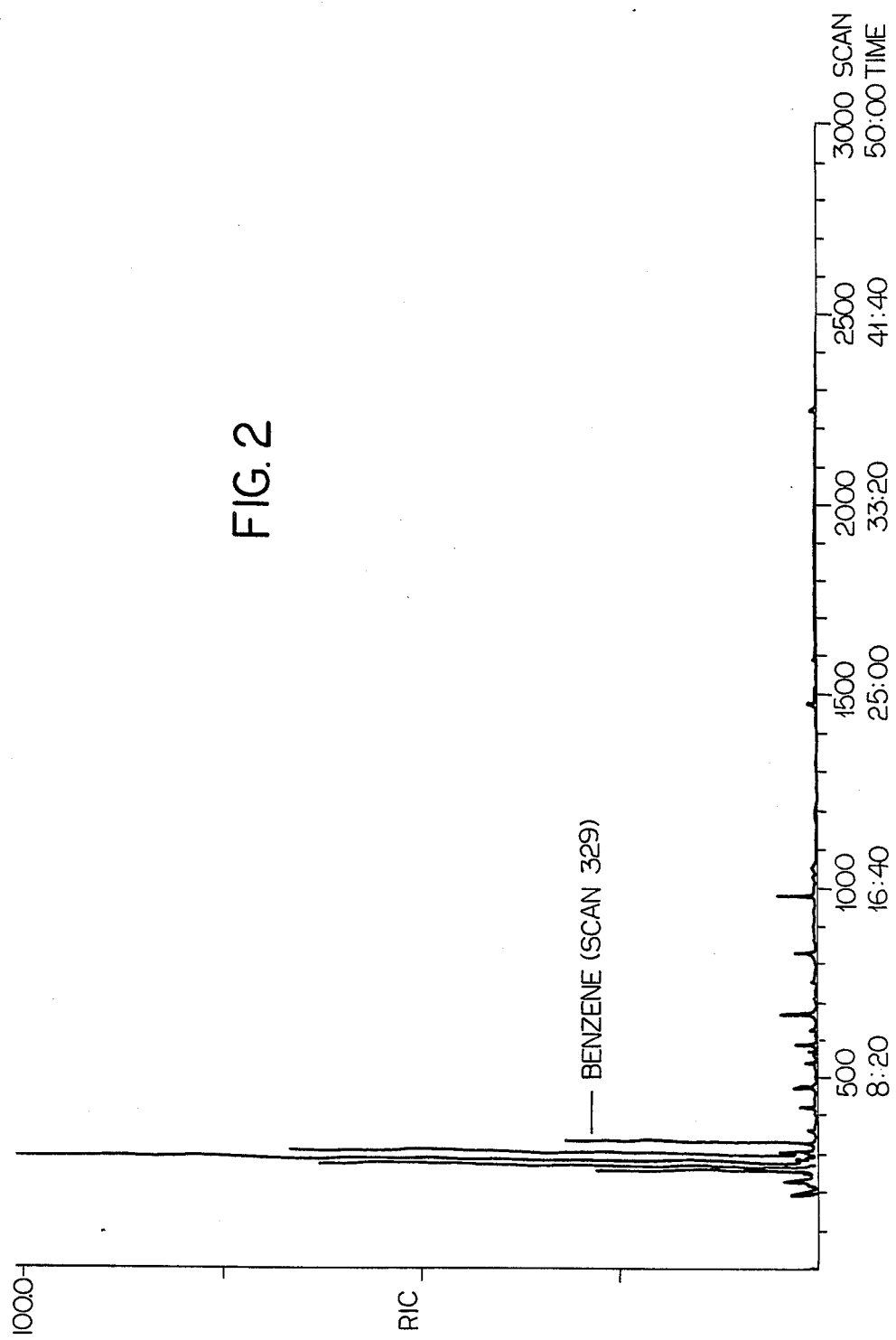

NON-TOXIC RUBBER-BASED COMPOSITION AND METHOD FOR MAKING THE RUBBER BASED COMPOSITION

BACKGROUND OF THE INVENTION

1. Field of the Invention

The present invention generally relates to a non-toxic, sticky rubber-based composition and, more particularly, is concerned with a method for making the non-toxic rubber-based composition for use in toys.

2. Description of the Prior Art

Recently, a toy made of a rubber-based composition has gained immense popularity in both Japan and the United States. The toy is marketed under the trademark WACKY WALLWALKER in the United States. The toys are manufactured in an octopus shape and are composed of a sticky, rubber-based composition. When applied to a smooth wall or glass surface, the octopus-shaped toy appears to crawl down the surface. The rubber is sufficiently sticky to allow the toy to remain attached to the wall. However, the force of gravity pulls the toy down the surface. As the toy moves down the surface, it flips and turns and appears to be walking or crawling in an octopus-like manner.

While the octopus-shaped toys have enjoyed tremendous commercial success as individual items, a substantial market exists for the toys as "premium" items. A "premium" item is a product which is included for free or at a low cost when another product is purchased.

Premium items are often enclosed with food products, such as popcorn or cereal. Thus, it is important that the premium item be non-toxic, and safe for inclusion in packages containing products intended for human consumption. The prior art rubber-based toys contain significant amounts of benzene or other potentially toxic components. Thus, manufacturers of food products desiring to include the toys product as a premium item must resort to expensive packaging of the premium item in order to protect the food product from potentially toxic materials. Further, even when suitable packaging is used, there remains a danger that the toxic substance will migrate through the packaging.

SUMMARY OF THE INVENTION

It is an object of the present invention to provide a sticky rubber-based composition which is suitable for use in manufacturing toys.

It is a further object of the present invention to provide a method for making a sticky rubber-based composition which is suitable for use in manufacturing toys.

A still further object of the present invention is to provide a non-toxic, rubber-based composition which contains no benzene or other toxic substances.

Other objects and features of the present invention will become apparent to those skilled in the art as the disclosure is made in the following description of a preferred embodiment of the present invention as illustrated in the accompanying sheets of drawings wherein:

BRIEF DESCRIPTION OF THE DRAWINGS

FIG. 2 is a representation of the mass spectrophotometric analysis of a prior art rubber-based composition.

DETAILED DESCRIPTION OF THE PREFERRED EMBODIMENT

Figure 1:
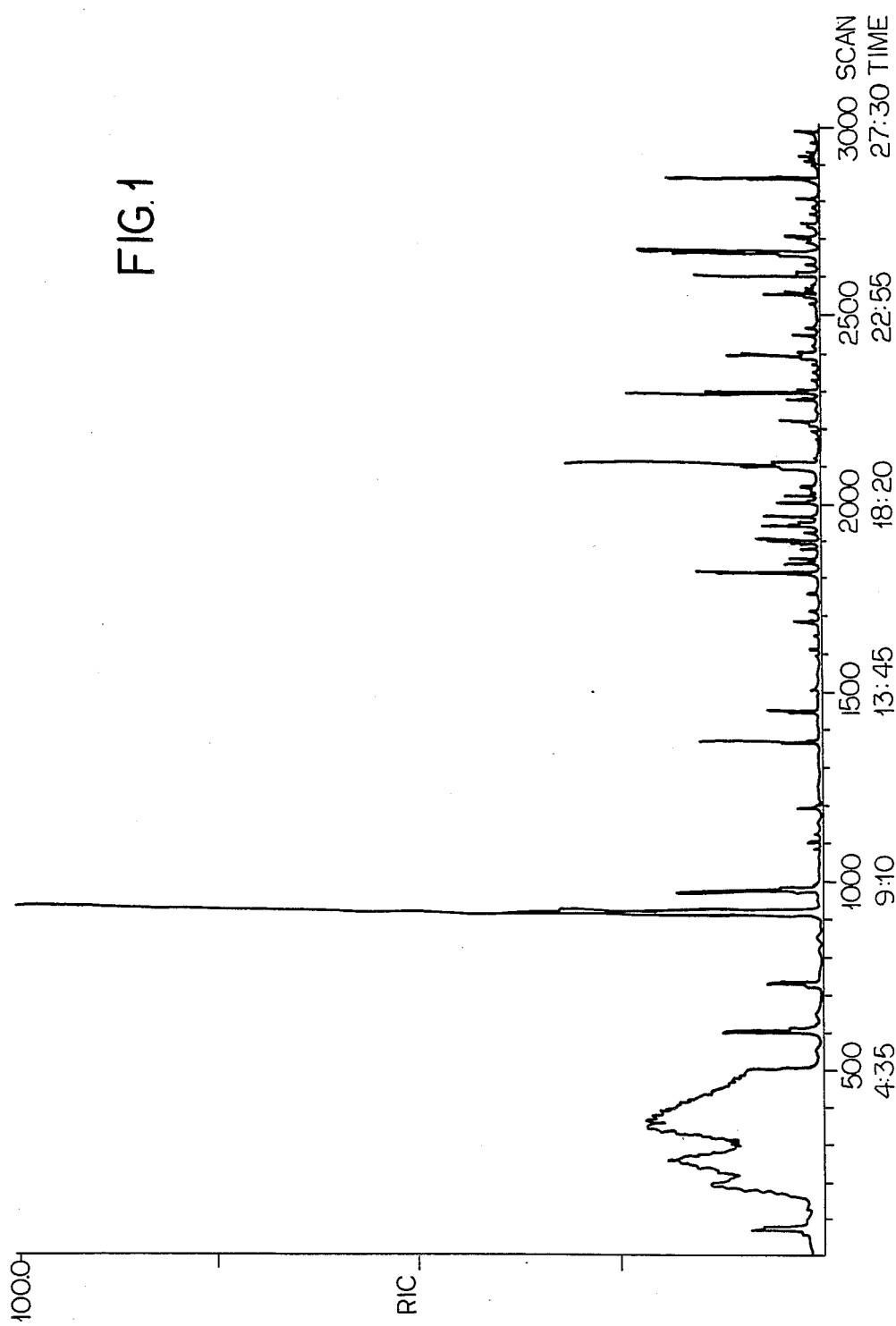
FIG. 1 is a representation of the mass spectrophotometric analysis of the composition of the present invention.

The non-toxic composition of the present invention contains from about 40 to about 45% of a synthetic rubber. Although styrene butadiene rubber is the preferred synthetic rubber, any natural or synthetic rubber which has the characteristics of styrene butadiene rubber may be used in the composition of the present invention. A particularly suitable styrene butadiene rubber product is manufactured by Shell Chemical Co. and sold under the tradename Cariflex.

The rubber-based composition of the present invention also contains from about 30 to about 35% of a suitable oil, such as paraffin oil or naphthene oil. About 15 to 25% of ester gum, from about 2 to 8% calcium carbonate and about 0.2 to 6% of a suitable coloring agent are then added to the rubber and oil mixture.

In a preferred embodiment, naphthene oil, sold by Shell Chemical Co. under the tradename Shellflex Oil, is used. A suitable ester gum is available from Arakawa Chemical Co. and sold under the tradename Super Ester. Any non-toxic coloring agent suitable for use in manufacturing rubber articles may be used in composition of the present invention. Suitable coloring agents are manufactured by Sumitomo Color Co. in a variety of shades.

The composition of the present invention also may contain metallic particles and/or phosphorescent material to give the rubber-based composition "glow-in-the-dark" properties.

In accordance with the process of the present invention, the styrene butadiene rubber is ground to particles having a diameter of less than 0.5 millimeters. The oil is added to the rubber, heated to approximately 40° to 70° C., and mixed for 10 to 20 minutes. The heating and mixing steps are important to insure that the oil is blended with the rubber and becomes absorbed by the rubber.

After heating and mixing the oil and rubber until the oil is completely absorbed, the ester gum, calcium carbonate, and coloring agent are added to the oil and rubber mixture.

Upon mixing the remaining ingredients with the rubber and oil mixture, the rubber based composition of the present invention is suitable for use in manufacturing a desired product. If a toy is to be manufactured, the mixture may be subjected to injection molding at approximately 100 to 130 psi, at approximately 160° to 180° C., at a pressing time of about 15 to 25 seconds to produce a sticky, non-toxic toy which is suitable for inclusion with a food product.

To facilitate understanding the advantages and operation of the present invention, the following example is provided to specifically illustrate the composition of the present invention. Thus, in a preferred embodiment, the composition of the present invention contains:

styrene butadiene rubber: 43%
naphthene oil: 32%
ester gum: 20%
calcium carbonate: 5%
coloring agent: 1%

In a preferred embodiment of the method of the present invention, the 32% oil and 43% rubber are heated to a temperature of between 50° and 60° C. and mixed for 13 to 15 minutes before the remaining ingredients are added in the amounts set forth in the preferred embodiment.

The rubber-based composition of the present invention was analyzed by mass spectrophotometry, the results of which are set forth in FIG. 1. The results of a mass spectrophotometric analysis of the composition used in the prior art is set forth in FIG. 2. As seen in FIG. 1, the composition of the present invention contains no benzene or other potentially toxic components. However, the composition of the prior art contains benzene, which renders any article manufactured from the prior art composition unsuitable for inclusion in food products intended for human consumption.

Although the composition of the present invention is described as useful in manufacturing toys, it is understood that the non-toxic rubber based composition may be used to manufacture any article for which the characteristics and properties of the composition disclosed and described herein are desirable.

As will be readily understood by those of ordinary skill in the art, minor modifications may be made in the process described without in any way departing from the spirit and scope of the invention. Accordingly, it is understood that the invention will not be limited to the exact details disclosed above, but will be defined in accordance with the appended claims.

What I claim is:

1. A process for manufacturing a sticky, non-toxic rubber-based toy which comprises the steps of:
    grinding styrene butadiene rubber into particles having a diameter of less than 0.5 millimeters,
    adding an oil selected from the group consisting of paraffin and naphthene oils;
    heating said oil and rubber to a temperature of 50° to 60° C.;
    mixing said oil and rubber for from 13 to 15 minutes so that said oil becomes absorbed by said rubber;
    adding ester gum, calcium carbonate and a coloring agent to said rubber and oil mixture, and
    injection molding said rubber at a pressure of from about 100 to about 130 psi at from about 160° to about 180° C. to produce a sticky, rubber-based toy.

* * * * *